(12) United States Patent
Ikeda et al.

(10) Patent No.: US 10,865,266 B2
(45) Date of Patent: Dec. 15, 2020

(54) THERMOPLASTIC RESIN COMPOSITION

(71) Applicant: NIPPON A&L INC., Osaka (JP)

(72) Inventors: Taka Ikeda, Nagoya (JP); Takayoshi Fujiwara, Takaishi (JP)

(73) Assignee: NIPPON A&L INC., Osaka (JP)

(*) Notice: Subject to any disclaimer, the term of this patent is extended or adjusted under 35 U.S.C. 154(b) by 0 days.

(21) Appl. No.: 15/778,172

(22) PCT Filed: Dec. 7, 2016

(86) PCT No.: PCT/JP2016/086398
§ 371 (c)(1),
(2) Date: May 22, 2018

(87) PCT Pub. No.: WO2017/104508
PCT Pub. Date: Jun. 22, 2017

(65) Prior Publication Data
US 2018/0282461 A1    Oct. 4, 2018

(30) Foreign Application Priority Data

Dec. 15, 2015 (JP) ................................ 2015-244051

(51) Int. Cl.
| | | |
|---|---|---|
| C08L 25/12 | (2006.01) | |
| C08L 35/06 | (2006.01) | |
| C08L 51/04 | (2006.01) | |
| C08F 257/02 | (2006.01) | |
| C08F 279/04 | (2006.01) | |
| C08F 212/08 | (2006.01) | |
| C08F 222/36 | (2006.01) | |

(52) U.S. Cl.
CPC .......... *C08F 257/02* (2013.01); *C08F 212/08* (2013.01); *C08F 222/36* (2013.01); *C08F 279/04* (2013.01); *C08L 25/12* (2013.01); *C08L 35/06* (2013.01); *C08F 2500/17* (2013.01); *C08F 2800/20* (2013.01)

(58) Field of Classification Search
CPC .. C08F 2500/20; C08F 257/02; C08F 212/08; C08F 222/36; C08F 279/04; C08F 2500/17; C08F 2800/20; C08L 25/12; C08L 35/06
See application file for complete search history.

(56) References Cited

FOREIGN PATENT DOCUMENTS

| | | |
|---|---|---|
| CA | 2314460 A1 | 1/2001 |
| CN | 1269808 A | 10/2000 |
| CN | 1309675 A | 8/2001 |
| CN | 1404505 A | 3/2003 |
| CN | 1954030 A | 4/2007 |
| CN | 101074309 A | 11/2007 |
| CN | 101506299 A | 8/2009 |
| CN | 102149772 A | 8/2011 |
| CN | 102782039 A | 11/2012 |
| CN | 102918103 A | 2/2013 |
| CN | 104169361 A | 11/2014 |
| CN | 104870496 A | 8/2015 |
| JP | H02135255 A | 5/1990 |
| JP | H 04292648 A | 10/1992 |
| JP | H 06166795 A | 6/1994 |
| JP | H0873701 A | 3/1996 |
| JP | H 09216980 A | 8/1997 |
| JP | H09316263 A | 12/1997 |
| JP | H 101581 A | 1/1998 |
| JP | H1077384 A | 3/1998 |
| JP | H10330565 A | 12/1998 |
| JP | H1171433 A | 3/1999 |
| JP | 2000/044747 A | 2/2000 |
| JP | 2001/207011 A | 7/2001 |
| JP | 2002/146149 A | 5/2002 |
| JP | 2007/537326 A | 12/2007 |
| WO | WO 96/15188 A1 | 5/1996 |
| WO | WO 2005/111147 A1 | 11/2005 |
| WO | WO 2008/026554 A1 | 3/2008 |

OTHER PUBLICATIONS

Defintition of Reduced viscosity downloaded from https://goldbook.iupac.org/terms/view/R05220, Aug. 1, 2019.*
Definition of Relative viscosity increment downloaded from https://goldbook.iupac.org/terms/view/R05283, Aug. 1, 2019.*
Office Action dated Jan. 4, 2019 for Chinese Patent Application No. 201680057971.7, 8 pages.
International Report on Patentability dated Jun. 28, 2018 for PCT/JP2016/086398, 6 pages.
International Search Report dated Feb. 21, 2017 for PCT/JP2016/086398, 2 pages.

* cited by examiner

*Primary Examiner* — Irina S Zemel
*Assistant Examiner* — Jeffrey S Lenihan
(74) *Attorney, Agent, or Firm* — Squire Patton Boggs (US) LLP

(57) ABSTRACT

The present invention provides a thermoplastic resin composition comprising 10 to 60 mass % of a graft copolymer (A), 1 to 20 mass % of a copolymer (B), 10 to 88 mass % of a copolymer (C), and 1 to 10 mass % of a copolymer (D). The contents of (A) to (D) are each relative to the total amount thereof. Copolymers (A), (B), (C), and (D) are as described in the specification.

5 Claims, No Drawings

THERMOPLASTIC RESIN COMPOSITION

TECHNICAL FIELD

The present invention relates to a thermoplastic resin composition.

BACKGROUND ART

Rubber-reinforced styrene-based resins typified by an ABS resins have excellent processability and mechanical properties, so that the resins are used as material to be formed into various constituent members in a wide range of fields such as an automobile field, a household appliances field, and an office automation equipment field.

In the recent automobile field, weight saving of components is one of the most important issues for improvement in fuel efficiency, and thinning of resin components is performed as the means for weight saving. Examples of the method for achieving the thinning include a method involving an increase in the fluidity of the resin. However, important physical properties such as heat resistance and surface appearance are also required for resin components in addition to thinning A resin excellent in the balance among the fluidity, the heat resistance, and the appearance of molded products is therefore desired.

In Patent Literature 1, a thermoplastic resin composition comprising a graft copolymer (A) using a rubber component of which the gel content is specified, a maleimide copolymer (B) containing a specific amount of oligomer components having a molecular weight of 200 or more and 1000 or less, and a copolymer (C) composed of an unsaturated cyano compound unit and an aromatic vinyl compound unit, is disclosed as a thermoplastic resin composition excellent in the heat resistance, the weather resistance, the molding processability, and the surface appearance of molded products.

In Patent Literature 2, a thermoplastic resin composition comprising a graft copolymer (A) using a rubbery polymer of which the weight average molecular weight in terms of polystyrene of a toluene-soluble fraction, the gel content rate and the degree of swelling in toluene are specified, and a maleimide copolymer (B) of which the remaining maleimide monomer content, the total volatile fraction other than maleimide monomers, the content of oligomer components having a molecular weight of 200 or more and 1000 or less, and the intrinsic viscosity are specified, is disclosed as a thermoplastic resin composition excellent in the heat resistance, the impact resistance, and the molding processability.

However, the fluidity of the thermoplastic resin compositions described in Patent Literature 1 and 2 and the appearance of molded products obtained therefrom are not necessarily satisfactory, though the heat resistance can be improved.

CITATION LIST

Patent Literature

Patent Literature 1: Japanese Unexamined Patent Publication No. H8-73701
Patent Literature 2: Japanese Unexamined Patent Publication No. H10-77384

SUMMARY OF INVENTION

Technical Problem

It is an object of the present invention to provide a thermoplastic resin composition excellent in the balance among the fluidity, the heat resistance, and the appearance of molded products.

Solution to Problem

As a result of earnest studies, the present inventors have found that a composition which contains specified amounts of a graft copolymer, a maleimide copolymer and a styrene copolymer, the styrene copolymer having a reduced viscosity in a specified range, can solve the problems, and have accomplished the present invention.

Specifically, the present invention provides a thermoplastic resin composition comprising a graft copolymer (A) obtained by graft polymerization of aromatic vinyl monomers and monomers other than maleimide monomers that can be copolymerized with the aromatic vinyl monomers under the presence of a rubbery polymer, a copolymer (B) obtained by polymerization of maleimide monomers and other monomers that can be copolymerized with the maleimide monomers, a copolymer (C) having a reduced viscosity of less than 1.0 dl/g obtained by polymerization of aromatic vinyl monomers and monomers other than maleimide monomers that can be copolymerized with the aromatic vinyl monomers, and a copolymer (D) having a reduced viscosity of 1.0 to 3.0 dl/g obtained by polymerization of aromatic vinyl monomers and monomers other than maleimide monomers that can be copolymerized with the aromatic vinyl monomers, wherein the content of the graft copolymer (A) is 10 to 60 mass %, the content of the copolymer (B) is 1 to 20 mass %, the content of the copolymer (C) is 10 to 88 mass %, and the content of the copolymer (D) is 1 to 10 mass %, based on the total amount of the graft copolymer (A), the copolymer (B), the copolymer (C), and the copolymer (D).

It is preferable that the thermoplastic resin composition have a melt volume rate of 15 $cm^3$/10 min or more as measured under conditions of a measurement temperature of 220° C. and a measurement load of 10 kgf.

Further, it is preferable that the copolymer (D) in the thermoplastic resin composition have a reduced viscosity of 1.0 to 1.4 dl/g.

Advantageous Effects of Invention

According to the present invention, a thermoplastic resin composition excellent in the balance among the fluidity, the heat resistance, and the appearance of molded products can be provided.

DESCRIPTION OF EMBODIMENTS

The present invention will be described in detail below.
The thermoplastic resin composition in an embodiment of the present invention is a thermoplastic resin composition comprising a graft copolymer (A) obtained by graft polymerization of aromatic vinyl monomers and monomers other than maleimide monomers that can be copolymerized with the aromatic vinyl monomers, a copolymer (B) obtained by polymerization of maleimide monomers and other monomers that can be copolymerized with the maleimide monomers, a copolymer (C) having a reduced viscosity of less than 1.0 dl/g obtained by polymerization of aromatic vinyl monomers and monomers other than maleimide monomers that can be copolymerized with the aromatic vinyl monomers, and a copolymer (D) having a reduced viscosity of 1.0 to 3.0 dl/g obtained by polymerization of aromatic vinyl monomers and monomers other than maleimide monomers that can be copolymerized with the aromatic vinyl monomers, wherein the content of the graft copolymer (A) is 10 to 60 mass %, the content of the copolymer (B) is 1 to 20 mass %, the content of the copolymer (C) is 10 to 88 mass %, and the content of the copolymer (D) is 1 to 10 mass %, based on the total amount of the graft copolymer (A), the copolymer (B), the copolymer (C), and the copolymer (D).

The rubbery polymer to constitute the graft copolymer (A) is not particularly limited, and conjugated diene rubbers such as polybutadiene rubbers, styrene-butadiene rubbers (SBR), and acrylonitrile-butadiene rubbers (NBR); ethylene-propylene rubbers such as ethylene-propylene rubbers and ethylene-propylene-non-conjugated dien (ethylidene norbornene, dicyclopentadiene, etc.) rubbers; acrylic rubbers such as polybutylacrylate rubbers; and silicone rubbers; which can be obtained by a conventional polymerization method, may be used alone or in combination of two or more. Composite rubbers having a core-shell structure are also encompassed by the acrylic rubbers, and examples of the composite rubbers (described in the order of core/shell) include conjugated diene rubbers/acrylic rubbers, silicone rubbers/acrylic rubbers, and rigid polymers (glass transition temperature: 20° C. or higher)/acrylic rubbers. Among the rubbery polymers, polybutadiene rubbers, styrene-butadiene rubbers, ethylene-propylene-non-conjugated diene rubbers, conjugated diene rubbers/acrylic rubbers, silicone rubbers/acrylic rubbers, rigid polymers (glass transition temperature: 20° C. or higher)/acrylic rubbers are preferred. Further, in order to balance with the weather resistance, use of ethylene-propylene-non-conjugated diene rubbers, conjugated diene rubbers/acrylic rubbers, silicone rubbers/acrylic rubbers, rigid polymers (glass transition temperature: 20° C. or higher)/acrylic rubbers are preferred; and in order to balance with coloring properties (colorability), use of conjugated diene rubbers/acrylic rubbers and rigid polymers (glass transition temperature: 20° C. or higher)/acrylic rubbers are preferred. Examples of the rigid polymers (glass transition temperature: 20° C. or higher) include polymers obtained by polymerization of monomers that contain at least one selected from aromatic vinyl monomers, vinyl cyanide monomers, and (meth)acrylate ester monomers.

The weight average particle diameter of the rubbery polymer is preferably 0.01 to 2.0 μm, more preferably 0.1 to 1.0 μm in view of improving the balance of physical properties such as the impact resistance, the fluidity, and the coloring properties, though not particularly limited. Rubbery polymers having a weight average particle diameter of 0.05 to 0.3 μm may be enlarged by aggregation, so that the weight average particle diameter can be adjusted.

The graft copolymer (A) for use in the thermoplastic resin composition in the present embodiment can be obtained by graft polymerization of aromatic vinyl monomers and other monomers (excluding maleimide monomers) that can be copolymerized with the aromatic vinyl monomers in the presence of a rubbery polymer described above.

The content of the rubbery polymer in the graft copolymer (A) is preferably 20 to 80 mass %, more preferably 40 to 75 mass %, based on the total amount of the graft copolymer (A), in view of improving the balance of physical properties such as the heat resistance, the fluidity and the coloring properties.

Examples of the aromatic vinyl monomers to constitute the graft copolymer (A) include styrene, α-methylstyrene, para-methylstyrene, and bromostyrene. These may be used alone or in combination of two or more. In particular, styrene and α-methylstyrene are preferred.

Examples of the other monomers to constitute the graft copolymer (A), which can be copolymerized with aromatic vinyl monomers, (excluding maleimide monomers) include vinyl cyanide monomers, (meth)acrylate ester monomers, amide monomers, and unsaturated carboxylic acid monomers. These may be used alone or in combination of two or more. Examples of the vinyl cyanide monomers include acrylonitrile, methacrylonitrile, ethacrylonitrile and fumaronitrile; examples of the (meth)acrylate ester monomers include methyl (meth)acrylate, ethyl (meth)acrylate, propyl (meth)acrylate, butyl (meth)acrylate, 2-ethylhexyl acrylate, phenyl (meth)acrylate, 4-t-butylphenyl (meth)acrylate, (di) bromophenyl (meth)acrylate, and chlorophenyl (meth)acrylate; examples of the amide monomers include acrylamide and methacrylamide; and examples of the unsaturated carboxylic acid monomers include acrylic acid, methacrylic acid, maleic acid, fumaric acid, and itaconic acid.

Although the composition ratios of the monomers to be graft-polymerized with a rubbery polymer are not particularly limited, composition ratios of 50 to 90 mass % of aromatic vinyl monomers, 10 to 50 mass % of vinyl cyanide monomers, and 0 to 40 mass % of other monomers which can be copolymerized with aromatic vinyl monomers, composition ratios of 30 to 80 mass % of aromatic vinyl monomers, 20 to 70 mass % of (meth)acrylate ester monomers, and 0 to 50 mass % of other vinyl monomers that can be copolymerized with aromatic vinyl monomers, and composition ratios of 20 to 70 mass % of aromatic vinyl monomers, 20 to 70 mass % of (meth)acrylate ester monomers, 10 to 60 mass % of vinyl cyanide monomers, and 0 to 50 mass % of other monomers that can be copolymerized with aromatic vinyl monomers are preferred (the total amount of monomers to be graft polymerized with the rubbery polymer is taken as 100 mass %).

The graft copolymer (A) is manufactured by graft polymerization of aromatic vinyl monomers and monomers other than maleimide monomers that can be copolymerized with the aromatic vinyl monomers in the presence of a rubbery polymer. The polymers after the graft polymerization may include a copolymer obtained by copolymerization of aromatic vinyl monomers not grafted to the rubbery polymer and the other monomers that can be copolymerized with the aromatic vinyl monomers (excluding maleimide monomers), besides the graft copolymer (A), in some cases. While the graft copolymer (A) is insoluble in acetone, the copolymer not grafted to the rubbery polymer is soluble in acetone, so that by using the properties, the graft ratio of the polymer after graft polymerization and the reduced viscosity of the acetone-soluble fraction can be obtained. Although there is no particular limitation on the graft ratio of the polymer after graft polymerization and the reduced viscosity of the acetone-soluble fraction, the graft ratio is preferably 10 to 150%, more preferably 20 to 100%, in view of improving the balance of physical properties such as the impact resistance, the fluidity, and the coloring properties. From the same viewpoint, the reduced viscosity of the acetone-soluble fraction is preferably 0.2 to 0.9 dl/g, more preferably 0.3 to 0.7 dl/g.

The graft ratio and the reduced viscosity of the acetone-soluble fraction can be obtained as follows.

$$\text{Graft ratio (\%)} = (X-Y)/Y \times 100$$

X: mass of acetone-insoluble fraction in polymer after graft polymerization

Y: mass of rubbery polymer in polymer after graft polymerization

Reduced Viscosity (dl/g) of Acetone-Soluble Fraction

The acetone-soluble fraction in the polymer after graft polymerization was dried and then dissolved in N,N-dimethylformamide to make a solution at a concentration of 0.4 g/100 ml, of which the flow time was measured at 30° C. using a Cannon-Fenske viscometer to determine the reduced viscosity.

The graft copolymer (A) thus obtained typically contains mainly a grafted polymer obtained by grafting aromatic vinyl monomers and other monomers that can be copolymerized with the aromatic vinyl monomers (excluding maleimide monomers) to a rubbery polymer. A copolymer that may be produced in the manufacturing process of the graft copolymer (A) by copolymerization of aromatic vinyl monomers not grafted to the rubbery polymer and the other monomers that can be copolymerized with the aromatic vinyl monomers (excluding maleimide monomers) is not included in the graft copolymer (A). Such a copolymer not grafted to the rubbery polymer is classified into, for example, a copolymer (C) or a copolymer (D).

The copolymer (B) can be obtained by polymerization of maleimide monomers and other monomers that can be copolymerized with the maleimide monomers.

Examples of the maleimide monomers to constitute the copolymer (B) include N-phenylmaleimide and N-cyclohexylmaleimide. These may be used alone or in combination of two or more. In particular, N-phenylmaleimide is preferred.

Examples of the other monomers that can be copolymerized with maleimide monomers to constitute the copolymer (B) include aromatic vinyl monomers, vinyl cyanide monomers, (meth)acrylate ester monomers, amide monomers, and unsaturated carboxylic acid monomers. These may be used alone or in combination of two or more. Examples of the aromatic vinyl monomers include styrene, α-methylstyrene, para-methylstyrene, and bromostyrene; examples of the vinyl cyanide monomers include acrylonitrile, methacrylonitrile, ethacrylonitrile, and fumaronitrile; examples of the (meth)acrylate ester monomers include methyl (meth)acrylate, ethyl (meth)acrylate, propyl (meth)acrylate, butyl (meth)acrylate, 2-ethylhexyl acrylate, phenyl (meth)acrylate, 4-t-butylphenyl (meth)acrylate, (di)bromophenyl (meth)acrylate, and chlorophenyl (meth)acrylate; examples of the amide monomers include acrylamide and methacrylamide; and examples of the unsaturated carboxylic acid monomers include acrylic acid, methacrylic acid, maleic acid, fumaric acid, and itaconic acid.

Although there is no particular limitation on the composition ratios of the monomers to constitute the copolymer (B), composition ratios of 10 to 50 mass % of maleimide monomers, 30 to 45 mass % of aromatic vinyl monomers, 5 to 20 mass % of vinyl cyanide monomers, and 0 to 55 mass % of other monomers that can be copolymerized with maleimide monomers are preferred (the total amount of monomers to constitute the copolymer (B) is taken as 100 mass %).

The copolymer (C) can be obtained by polymerization of aromatic vinyl monomers and other monomers that can be copolymerized with the aromatic vinyl monomers (excluding maleimide monomers).

Examples of the aromatic vinyl monomers to constitute the copolymer (C) include styrene, α-methylstyrene, para-methylstyrene, and bromostyrene. These may be used alone or in combination of two or more. In particular, styrene and α-methylstyrene are preferred.

Examples of the other monomers to constitute the copolymer (C) that can be copolymerized with aromatic vinyl monomers (excluding maleimide monomers) include vinyl cyanide monomers, (meth)acrylate ester monomers, amide monomers, and unsaturated carboxylic acid monomers. These may be used alone or in combination of two or more. Examples of the vinyl cyanide monomers include acrylonitrile, methacrylonitrile, ethacrylonitrile, and fumaronitrile; examples of the (meth)acrylate ester monomers include methyl (meth)acrylate, ethyl (meth)acrylate, propyl (meth)acrylate, butyl (meth)acrylate, 2-ethylhexyl acrylate, phenyl (meth)acrylate, 4-t-butylphenyl (meth)acrylate, (di)bromophenyl (meth)acrylate, and chlorophenyl (meth)acrylate; examples of the amide monomers include acrylamide and methacrylamide; and examples of the unsaturated carboxylic acid monomers include acrylic acid, methacrylic acid, maleic acid, fumaric acid, and itaconic acid.

Although there is no particular limitation on the composition ratios of the monomers to constitute the copolymer (C), composition ratios of 50 to 90 mass % of aromatic vinyl monomers, 10 to 50 mass % of vinyl cyanide monomers, and 0 to 40 mass % of other monomers that can be copolymerized with aromatic vinyl monomers, composition ratios of 30 to 80 mass % of aromatic vinyl monomers, 20 to 70 mass % of (meth)acrylate ester monomers, and 0 to 50 mass % of other vinyl monomers that can be copolymerized with aromatic vinyl monomers; and composition ratios of 20 to 70 mass % of aromatic vinyl monomers, 20 to 70 mass % of (meth)acrylate ester monomers, 10 to 60 mass % of vinyl cyanide monomers, and 0 to 50 mass % of other monomers that can be copolymerized with aromatic vinyl monomers are preferred.

The reduced viscosity of the copolymer (C) is required to be less than 1.0 dl/g, and is preferably 0.3 to 0.8 dl/g, more preferably 0.4 to 0.7 dl/g. The reduced viscosity of the copolymer (C) is controlled to be in the range, so that good injection moldability can be achieved.

The reduced viscosity can be determined by the following method.

The copolymer (C) is dissolved in N,N-dimethylformamide to make a solution at a concentration of 0.4 g/100 ml, of which the flow time is then measured at 30° C. using a Cannon-Fenske viscometer to determine the reduced viscosity.

The copolymer (D) can be obtained by polymerization of aromatic vinyl monomers and other monomers that can be copolymerized with the aromatic vinyl monomers (excluding maleimide monomers). The monomers to constitute the copolymer (D) and the composition ratios of the monomers may be the same as those for the copolymer (C).

The reduced viscosity of the copolymer (D) is required to be 1.0 to 3.0 dl/g, and is preferably 1.0 to 2.5 dl/g, more preferably 1.0 to 2.0 dl/g, still more preferably 1.0 to 1.4 dl/g, particularly preferably 1.1 to 1.4 dl/g. The reduced viscosity of the copolymer (D) is controlled to be in the range, so that the viscosity required for plasticization during an early stage of kneading can be achieved while preventing the reduction in fluidity.

The reduced viscosity can be determined by the same method as used for the copolymer (C).

The reduced viscosity of the copolymer (C) and that of the copolymer (D) each can be controlled to be in the aforementioned range by the type of monomers for use and the adjustment of the ratios, polymerization conditions, etc. Examples of the polymerization conditions include types and amount of a polymerization initiator, polymerization temperature, etc. The reduced viscosity tends to decrease as the amount of a polymerization initiator used increases, and tends to decrease as the polymerization temperature increases.

The polymerization methods of the graft copolymer (A), the copolymer (B), the copolymer (C) and the copolymer (D) to constitute the thermoplastic resin composition are not particularly limited, and the copolymers can be manufactured, for example, by emulsion polymerization, suspension polymerization, solution polymerization, bulk polymerization and combinations thereof.

In the thermoplastic resin composition of the present embodiment, it is required that the content of the graft copolymer (A) be 10 to 60 mass %, the content of the copolymer (B) be 1 to 20 mass %, the content of the copolymer (C) be 10 to 88 mass %, and the content of the copolymer (D) be 1 to 10 mass %, based on the total amount thereof (100 mass %).

The content of the graft copolymer (A) is 10 to 60 mass % (the total amount of (A) to (D) is taken as 100 mass %), preferably 15 to 55 mass %, more preferably 20 to 50 mass %. The content of the graft copolymer (A) is controlled to be in the range, so that the balance between the fluidity and the impact resistance can be improved.

The content of the copolymer (B) is 1 to 20 mass % (the total amount of (A) to (D) is taken as 100 mass %), preferably 3 to 18 mass %, more preferably 5 to 15 mass %. The content of the copolymer (B) is controlled to be in the range, so that the balance between the fluidity and the impact resistance can be improved.

The content of the copolymer (C) is 10 to 88 mass % (the total amount of (A) to (D) is taken as 100 mass %), preferably 19 to 80 mass %, more preferably 28 to 72 mass %. The content of the copolymer (C) is controlled to be in the range, so that the balance between the fluidity and the impact resistance can be improved.

The content of the copolymer (D) is 1 to 10 mass % (the total amount of (A) to (D) is taken as 100 mass %), preferably 2 to 8 mass %, more preferably 3 to 7 mass %. The content of the copolymer (D) is controlled to be in the range, so that the balance between the fluidity and the appearance of molded products can be improved.

In the thermoplastic resin composition of the present embodiment, another thermoplastic resin composition may be mixed. Examples of the other thermoplastic resins for use include acrylic resins such as polymethyl methacrylate, polycarbonate resins, polybutylene terephthalate resins, polyethylene terephthalate resins, polyamide resins, and polylactic resins.

In the thermoplastic resin composition of the present embodiment, hindered amine light stabilizers; antioxidants such as hindered phenols, sulfur-containing organic compounds and phosphorus-containing organic compounds; heat stabilizers such as phenols and acrylates; ultraviolet absorbers such as benzoates, benzotriazoles, benzophenones and salicylates; lubricants such as organic nickels and higher fatty acid amides; plasticizers such as phosphate esters; halogen-containing compounds such as poly-bromophenyl ether, tetrabromobisphenol-A, brominated epoxy oligomer and bromides; flame retardants or flame retardant aids such as phosphorus compounds and antimony trioxide; odor masking agents; pigments such as carbon black and titanium oxide; and dyes may be further added. Also, reinforcing agents or fillers such as talc, calcium carbonate, aluminum hydroxide, glass fibers, glass flakes, glass beads, glass wools, carbon fibers, and metal fibers may be further added.

As for the fluidity of the thermoplastic resin composition of the present embodiment, it is preferable that the melt volume rate measured under conditions of a measurement temperature of 220° C. and a measurement load of 10 kgf be 15 $cm^3$/10 minutes or more. The melt volume rate of the thermoplastic resin composition is controlled to be in the range, so that, for example, filling along a mold shape can be achieved in injection molding even for a product design with thinner and more complex shapes.

The thermoplastic resin composition of the present embodiment can be obtained by kneading the respective components with a roll, a Banbury mixer, an extruder, a kneader or the like, which is conventionally used.

The method for kneading the respective components is not particularly limited, and examples thereof include: (1) a method for kneading all the components at one time, (2) a method for kneading specific components and then kneading the remaining components, and (3) a method for kneading the kneaded product again.

From the thermoplastic resin composition of the present embodiment, molded products can be obtained by various processing methods. Examples of the processing methods include extrusion molding, injection molding, blow molding, and vacuum molding.

EXAMPLES

The present invention will be described in detail based on Examples below, though the invention is not limited thereto. All the parts and % shown in Examples are by mass.

<Manufacturing of Graft Copolymer (A)>

A glass reactor was charged with enlarged aggregates of styrene-butadiene rubber latex (weight average particle diameter: 0.25 µm) in an amount of 50 parts by mass in terms of solid content and purged with nitrogen. When the inside of the reactor tank was heated to a temperature of 65° C. after the nitrogen purge, an aqueous solution of 0.2 parts by mass of lactose, 0.1 parts by mass of anhydrous sodium pyrophosphate and 0.005 parts by mass of ferrous sulphate dissolved in 10 parts by mass of deionized water was added therein and then the temperature was raised to 70° C. Thereafter, a mixture liquid of 15 parts by mass of acrylonitrile, 35 parts by mass of styrene, 0.05 parts of tertiary dodecyl mercaptan, and 0.3 parts by mass of cumene hydroperoxide and an aqueous solution of emulsifier prepared by dissolving 1.0 part by mass of potassium oleate in 20 parts by mass of deionized water were continuously dropped over a period of 4 hours. After the dropping, a graft copolymer latex was obtained with a hold time of 3 hours. Thereafter, through salting out, dewatering and drying, powder of the graft copolymer (A) was obtained. The resulting powder of a graft copolymer (A) had a graft ratio of 37.0% with an acetone-soluble fraction having a reduced viscosity of 0.39 dl/g. The acetone-soluble fraction is a copolymer not grafted to the rubber polymer, corresponding to a copolymer (C) due to having a reduced viscosity of 0.39 dl/g. In other words, the resulting powder of the graft copolymer (A) is a mixture of 68.5 mass % of the graft copolymer (A) and 31.5 mass % of the copolymer (C).

<Copolymer (B)>

Trade name "Denka IP MS-NIP" manufactured by Denka Co., Ltd.

(Styrene/N-phenylmaleimide/maleic Anhydride Copolymer)

<Manufacturing of Copolymer (C)>

A reactor purged with nitrogen was continuously charged with a monomer mixture consisting of 66.2 parts by mass of styrene, 22.1 parts by mass of acrylonitrile, 11.7 parts by mass of ethylbenzene, 0.55 parts by mass of t-dodecyl mercaptan, and 0.1 parts by mass of perbutyl peroxide, and polymerization was performed at 95° C. The polymerizing liquid was led from the reactor to a preheater and a vacuum chamber for a separation and collection process, and a styrene copolymer (C) was obtained after collection and extrusion. The reduced viscosity of the obtained styrene copolymer (C) was 0.45 dl/g.

<Manufacturing of Copolymer (D-1)>

A reactor was charged with 120 parts of ion-exchange water and purged with nitrogen. The reactor was then heated to a temperature of 60° C., and charged with a 3% aqueous solution in which 0.3 parts by mass of potassium persulphate was dissolved as a polymerization initiator. Thereafter, a mixture liquid of 75 parts by mass of styrene, 25 parts by mass of acrylonitrile and 0.07 parts of tertiary dodecyl mercaptan, and a 5% aqueous solution in which 1.5 parts by mass of potassium oleate was dissolved were continuously dropped at 60° C. over a period of 4 hours. Thereafter, with a hold time of 3 hours at 60° C., the polymerization was terminated. The obtained styrene copolymer latex was subjected to salting out, dewatering and drying, so that powder of a styrene copolymer (D-1) was obtained. The resulting styrene copolymer (D-1) had a reduced viscosity of 1.2 dl/g.

<Manufacturing of Copolymer (D-2)>

The polymerization was performed in the same manner as for the styrene copolymer (D-1), except that the amount of potassium persulphate was changed to 0.23 parts by mass and no tertiary dodecyl mercaptan was added, so that powder of a styrene copolymer (D-2) was obtained. The reduced viscosity of the obtained styrene copolymer (D-2) was 2.0 dl/g.

<Manufacturing of Copolymer (D-3)>

The polymerization was performed in the same manner as for the styrene copolymer (D-1), except that the amount of potassium persulphate was changed to 0.19 parts by mass and no tertiary dodecyl mercaptan was added, so that powder of a styrene copolymer (D-3) was obtained. The reduced viscosity of the obtained styrene copolymer (D-3) was 2.5 dl/g.

<Manufacturing of Copolymer (D-4)>

The polymerization was performed in the same manner as for the styrene copolymer (D-1), except that the amount of potassium persulphate was changed to 0.16 parts by mass and no tertiary dodecyl mercaptan was added, so that powder of a styrene copolymer (D-4) was obtained. The reduced viscosity of the obtained styrene copolymer (D-4) was 3.2 dl/g.

Examples 1 to 9 and Comparative Examples 1 to 5

The graft copolymer (A), the copolymer (B), the copolymer (C), the copolymers (D-1) to (D-4) were mixed at the compounding ratios in terms of solid content described in Table 1 (unit: mass %), then melt-kneaded under conditions of a main screw revolution speed of 300 rpm and a discharge rate of 15 kg/hr, using a 35 mm diameter twin-screw extruder with a cylinder temperature set at a 250° C., and pelletized. The compounding ratio of the graft copolymer (A) as powder (a mixture of a graft copolymer (A) and the copolymer (C)) was 40 mass % in Examples 1 to 3 and 6 to 9 and in Comparative Examples 1 to 5, 30 mass % in Example 4, and 50 mass % in Example 5. The obtained pellets of the thermoplastic resin compositions were subjected to the following evaluations.

<Evaluation of Fluidity>

The melt volume rate was measured in accordance with ISO 1133 (measurement temperature: 220° C., measurement load: 10 kgf) for the evaluation.

Unit: cm$^3$/10 min

<Evaluation of Heat Resistance>

(Evaluation 1: Measurement of Deflection Temperature Under Load)

A specimen was prepared in accordance with ISO 294. The deflection temperature under a load of 1.8 MPa of the specimen was measured in accordance with ISO 75.

Unit: ° C.

(Evaluation 2: Resistance to Thermal Deformation)

A molded product having a plate-like shape (length×width×thickness=127 mm×76 mm×2.5 mm) was formed from the obtained pellets, with an injection molding machine (trade name: J150E-P manufactured by Japan Steel Works Ltd., cylinder temperature: 250° C., mold temperature: 60° C.). The resulting molded product having a plate-like shape was heat treated in a shelf dryer preset at 105° C. for 1 hour, and evaluated on the surface change by visual inspection as follows.

A: Almost unchanged.

B: A part of the surface became whitish.

<Evaluation of Appearance of Molded Product at Flow End>

A molded product having a plate-like shape (thickness: 2.5 mm) was formed from the obtained pellets, with an injection molding machine (trade name: J150E-P manufactured by Japan Steel Works, Ltd., cylinder temperature: 250° C., mold temperature: 50° C., injection rate: 2%). The state of the resulting molded product at the flow end was visually evaluated as follows.

A: Having a gloss equivalent to that in the vicinity of the gate portion.

B: Having a gloss lower than that in the vicinity of the gate portion.

C: Insufficient filling due to insufficient fluidity.

These evaluation results are shown in Table 1.

TABLE 1

|  | Example 1 | Example 2 | Example 3 | Example 4 | Example 5 | Example 6 | Example 7 |
|---|---|---|---|---|---|---|---|
| Graft copolymer (A) | 27.4 | 27.4 | 27.4 | 20.55 | 34.25 | 27.4 | 27.4 |
| Copolymer (B) | 13 | 13 | 13 | 13 | 13 | 3 | 19 |
| Copolymer (C) | 58.6 | 56.6 | 51.6 | 63.45 | 49.75 | 66.6 | 50.6 |
| Copolymer (D-1) | 1 | 3 | 8 | 3 | 3 | 3 | 3 |
| Copolymer (D-2) | — | — | — | — | — | — | — |
| Copolymer (D-3) | — | — | — | — | — | — | — |
| Copolymer (D-4) | — | — | — | — | — | — | — |
| Total | 100 | 100 | 100 | 100 | 100 | 100 | 100 |
| Fluidity (cm$^3$/10 min) | 24 | 21 | 15 | 16 | 16 | 30 | 16 |
| Deflection temperature | 90 | 90 | 90 | 91 | 89 | 83 | 93 |

TABLE 1-continued

|  | | | | | | | |
|---|---|---|---|---|---|---|---|
| under load (° C.) | | | | | | | |
| Resistance to thermal deformation | A | A | A | A | A | A | A |
| Appearance at flow end | A | A | A | A | A | A | A |

| | Example 8 | Example 9 | Comparative Example 1 | Comparative Example 2 | Comparative Example 3 | Comparative Example 4 | Comparative Example 5 |
|---|---|---|---|---|---|---|---|
| Graft copolymer (A) | 27.4 | 27.4 | 27.4 | 27.4 | 27.4 | 27.4 | 27.4 |
| Copolymer (B) | 13 | 13 | 13 | 13 | 13 | 23 | — |
| Copolymer (C) | 56.6 | 58.6 | 59.1 | 49.1 | 56.6 | 46.6 | 69.6 |
| Copolymer (D-1) | — | — | 0.5 | 10.5 | — | 3 | 3 |
| Copolymer (D-2) | 3 | — | — | — | — | — | — |
| Copolymer (D-3) | — | 1 | — | — | — | — | — |
| Copolymer (D-4) | — | — | — | — | 3 | — | — |
| Total | 100 | 100 | 100 | 100 | 100 | 100 | 100 |
| Fluidity (cm³/10 min) | 16 | 19 | 22 | 9 | 8 | 7 | 30 |
| Deflection temperature under load (° C.) | 90 | 90 | 90 | 90 | 89 | 96 | 83 |
| Resistance to thermal deformation | A | A | C | A | A | A | C |
| Appearance at flow end | A | A | B | C | C | C | A |

As clearly shown in Table 1, any of the thermoplastic resin compositions in Examples 1 to 9 satisfying the requirements of the present invention resulted in excellent balance among the fluidity, the heat resistance and the appearance of molded products.

The thermoplastic resin composition in Comparative Example 1, in which the content of the copolymer (D) is less than the requirement of the present invention, resulted in the poor heat resistance and the poor appearance of molded products.

The thermoplastic resin composition in Comparative Example 2, in which the content of the copolymer (D) is more than the requirement of the present invention, resulted in the poor fluidity and the insufficient filling The thermoplastic resin composition in Comparative Example 3, in which the reduced viscosity of the polymer (D) is higher than the requirement of the present invention, resulted in the poor fluidity and the insufficient filling The thermoplastic resin composition of Comparative Example 4, in which the content of the copolymer (B) is more than the requirement of the present invention, resulted in the poor fluidity and the insufficient filling The thermoplastic resin composition in Comparative Example 5, in which the content of the copolymer (B) is less than the requirement of the present invention, resulted in the poor heat resistance.

INDUSTRIAL APPLICABILITY

As described above, the thermoplastic resin composition of the present invention is excellent in the balance among the fluidity, the heat resistance and the appearance of molded products, so that the composition can be used in a variety of applications such as automobile interior and exterior components, accommodating the market needs.

The invention claimed is:

1. A thermoplastic resin composition comprising:
a graft copolymer (A) obtained by graft polymerization of aromatic vinyl monomers and monomers other than maleimide monomers that can be copolymerized with the aromatic vinyl monomers under the presence of a rubbery polymer;
a copolymer (B) obtained by polymerization of only maleimide monomers and at least one type of other monomers selected from the group consisting of aromatic vinyl monomers, vinyl cyanide monomers, amide monomers, unsaturated carboxylic acid monomers, and combinations thereof;
a copolymer (C) having a reduced viscosity of less than 1.0 dl/g obtained by polymerization of aromatic vinyl monomers and monomers other than maleimide monomers that can be copolymerized with the aromatic vinyl monomers; and
a copolymer (D) having a reduced viscosity of 1.0 to 3.0 dl/g obtained by polymerization of aromatic vinyl monomers and monomers other than maleimide monomers that can be copolymerized with the aromatic vinyl monomers, wherein
the content of the graft copolymer (A) is 10 to 60 mass %, the content of the copolymer (B) is 1 to 20 mass %, the content of the copolymer (C) is 10 to 88 mass %, and the content of the copolymer (D) is 1 to 10 mass %, based on the total amount of the graft copolymer (A), the copolymer (B), the copolymer (C), and the copolymer (D);
the reduced viscosity is measured after dissolving the copolymer (C) or (D) in N,N-dimethylformamide to make a solution at a concentration of 0.4 g/100 ml then measuring at a temperature of 30° C.

2. The thermoplastic resin composition according to claim 1, wherein the thermoplastic resin composition has a melt volume rate of 15 cm³/10 min or more as measured under conditions of a measurement temperature of 220° C. and a measurement load of 10 kgf.

3. The thermoplastic resin composition according to claim 2, wherein the copolymer (D) has a reduced viscosity of 1.0 to 1.4 dl/g.

4. The thermoplastic resin composition according to claim 1, wherein the copolymer (D) has a reduced viscosity of 1.0 to 1.4 dl/g.

5. The thermoplastic resin composition according to claim 1, wherein the copolymer (B) is obtained by polymerization of only maleimide monomers and at least one type of other monomers selected from aromatic vinyl monomers, amide monomers, and unsaturated carboxylic acid monomers.

* * * * *